(12) United States Patent
Dannoux et al.

(10) Patent No.: US 8,397,540 B2
(45) Date of Patent: Mar. 19, 2013

(54) METHODS AND APPARATUS FOR REFORMING A GLASS SHEET

(75) Inventors: Thierry Luc Alain Dannoux, Avon (FR); Paul Delautre, Lisses (FR); Allan Mark Fredholm, Vulaines sur Seine (FR); Laurent Joubaud, Paris (FR)

(73) Assignee: Corning Incorporated, Corning, NY (US)

( * ) Notice: Subject to any disclaimer, the term of this patent is extended or adjusted under 35 U.S.C. 154(b) by 105 days.

(21) Appl. No.: 13/101,460

(22) Filed: May 5, 2011

(65) Prior Publication Data
US 2012/0279257 A1 Nov. 8, 2012

(51) Int. Cl.
*C03B 23/023* (2006.01)
(52) U.S. Cl. .......................................... 65/291; 65/106
(58) Field of Classification Search ................. 65/106, 65/291
See application file for complete search history.

(56) References Cited

U.S. PATENT DOCUMENTS

| | | | |
|---|---|---|---|
| 3,235,350 A | 2/1966 | Richardson | 65/107 |
| 3,340,037 A | 9/1967 | Stevenson | 65/287 |
| 3,682,613 A | 8/1972 | Johnson et al. | 65/289 |
| 4,229,200 A | 10/1980 | Seymour | 65/106 |
| 4,361,429 A | 11/1982 | Anderson et al. | 65/67 |
| 4,575,390 A | 3/1986 | McMaster | 65/273 |
| 4,661,141 A | 4/1987 | Nitschke et al. | 65/273 |
| 4,720,296 A | 1/1988 | Bartusel et al. | 65/290 |
| 4,746,348 A * | 5/1988 | Frank | 65/104 |
| 5,437,703 A | 8/1995 | Jacques et al. | 65/106 |
| 7,401,476 B2 | 7/2008 | Fukami et al. | 65/106 |
| 2006/0230790 A1 | 10/2006 | Yli-Vakkuri | 65/269 |
| 2010/0126222 A1 | 5/2010 | Dannoux | 65/105 |
| 2010/0140848 A1 | 6/2010 | Provence | 264/339 |

OTHER PUBLICATIONS

International Searching Authority; International Search Report; Date of Search: Oct. 15, 2012.

* cited by examiner

*Primary Examiner* — Queenie Dehghan
(74) *Attorney, Agent, or Firm* — Jeffrey A. Schmidt

(57) ABSTRACT

A deformation apparatus for reforming a glass sheet comprises a central portion, a first edge mold movably coupled to a first end of the central portion and configured to be linearly translated along a linear mold axis in a first direction toward the central portion. The deformation apparatus further includes a second edge mold movably coupled to the second end of the central portion and configured to be linearly translated along the linear mold axis in a second direction opposite the first direction and toward the central portion. Methods are also provided including the step of cooling a reformed glass sheet, wherein a greater shrinkage of the reformed glass sheet relative to a shrinkage of the deformation apparatus is accommodated by a movement of at least the first edge mold in a first direction toward the central portion of the deformation apparatus.

10 Claims, 6 Drawing Sheets

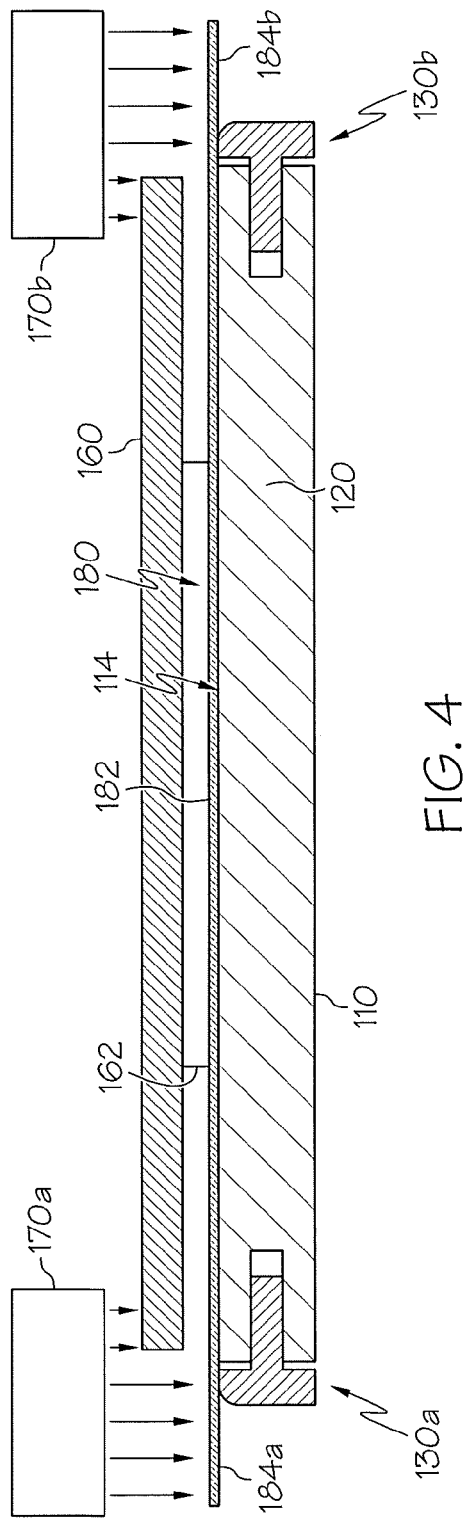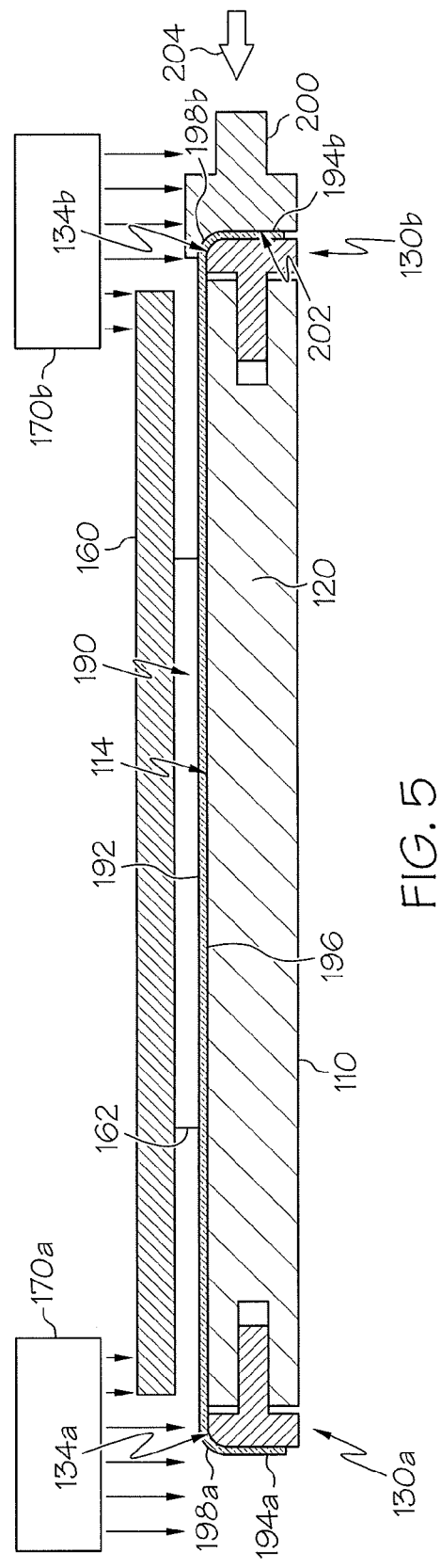

METHODS AND APPARATUS FOR REFORMING A GLASS SHEET

FIELD

The present disclosure relates generally to methods and apparatus for reforming a glass sheet and, more particularly, to methods and apparatus for reforming a glass sheet for use in a device, for example a display.

BACKGROUND

Glass sheets are commonly used, for example, in display applications, for example liquid crystal displays (LCDs), electrophoretic displays (EPD), organic light emitting diode displays (OLEDs), plasma display panels (PDPs), or the like. Glass sheets are commonly fabricated by flowing molten glass to a forming body whereby a glass ribbon may be formed by a variety of ribbon forming process techniques, for example, slot draw, float, down-draw, fusion down-draw, or up-draw. The glass ribbon may then be subsequently divided to provide sheet glass suitable for further processing into a desired display or other application. Nowadays there is a growing interest for extremely high quality thin glass sheets with 3D shapes, and in particular with a combination of flat portions and locally highly curved shapes, for use in display devices or other applications. Thus, there is a need for a process and apparatus which allow: retention of a high level of flatness in the desired areas, usually by far the largest area; retention of the pristine aspect of the glass sheets; desired amount of deformation in the areas of interest; and a high level of dimensional control. Such process and apparatus can be suitable for reforming glass sheets in a wide range of applications incorporating glass sheets such as appliances (e.g. display applications) or other devices incorporating a reformed glass sheet.

SUMMARY

There are set forth mold designs suited for the reforming glass sheets in a wide range of applications such as appliances (e.g., display applications) or other devices incorporating a reformed glass sheet. In one example, the mold designs can be suited for very large size sheets of glass for which the optical quality and flatness in the central zone is important and for which some significant deformation may be applied at the edges. The mold design enables compensation for dilatation differences and possibly the use of different materials according to the temperature seen in the reforming process.

According to a first aspect, there is provided a method of making a reformed glass sheet comprising the steps of:

(I) providing a deformation apparatus including a central portion extending along a linear mold axis between opposed first and second ends of the central portion, the deformation apparatus further provided with a first edge mold movably coupled to the first end of the central portion and a second edge mold coupled to the second end of the central portion;

(II) providing an initial glass sheet with a central portion and opposed edge portions;

(III) positioning the initial glass sheet relative to the deformation apparatus such that the central portion of the initial glass sheet engages the central portion of the deformation apparatus and at least one of the opposed edge portions of the initial glass sheet extends over a corresponding one of the first edge mold and the second edge mold;

(IV) heating the initial glass sheet; then (V) bending at least one of the extending edge portions of the initial glass sheet to follow a contour of a corresponding one of the first and second edge molds, wherein, after the step of bending, the reformed glass sheet is provided with opposed edge portions with at least one of the edge portions bent away from a side of a central portion of the reformed glass sheet; and then (VI) cooling the reformed glass sheet, wherein a greater shrinkage of the reformed glass sheet relative to a shrinkage of the deformation apparatus is accommodated by a movement of at least the first edge mold in a first direction toward the central portion of the deformation apparatus.

According to a second aspect, there is provided the method of aspect 1, wherein, during step (VI), the movement of the first edge mold includes a linear translational movement along the linear mold axis in the first direction.

According to a third aspect, there is provided the method of aspect 1 or aspect 2, wherein, during step (VI), the movement of the first edge mold does not include a rotational movement of the first edge mold relative to the central portion of the deformation apparatus.

According to a fourth aspect, there is provided the method of any one of aspects 1-3, wherein the second edge mold is movably coupled to the second end of the central portion, and during step (VI), the greater shrinkage of the reformed glass sheet relative to the shrinkage of the deformation apparatus is further accommodated by a movement of the second edge mold in a second direction toward the central portion of the deformation apparatus, wherein the second direction is opposite the first direction.

According to a fifth aspect, there is provided the method of any one of aspects 1-4, wherein, during step (IV), at least one of the opposed edge portions of the initial glass sheet is heated to a higher temperature than the central portion of the initial glass sheet.

According to a sixth aspect, there is provided the method of any one of aspects 1-5, wherein during step (IV), the central portion of the initial glass sheet is shielded such that at least one of the extending edge portions is heated to a higher temperature than the central portion of the initial glass sheet.

According to a seventh aspect, there is provided the method of any one of aspects 1-6, wherein, during step (V), the at least one of the extending edge portions is bent such that the bent edge portion is joined with the central portion of the reformed glass sheet with the bend including a radius of curvature from between about 2 mm to about 50 mm.

According to an eighth aspect, there is provided the method of any one of aspects 1-7, wherein, step (III) includes positioning the initial glass sheet relative to the deformation apparatus such that both of the opposed edge portions of the initial glass sheet extend over a corresponding one of the first edge mold and the second edge mold, and step (V) includes bending both of the edge portions of the initial glass sheet to follow a corresponding contour of the first and second edge molds, wherein, after the step of bending, the reformed glass sheet is provided with opposed edge portions that are each bent away from the side of the central portion of the reformed glass sheet.

According to a ninth aspect, there is provided a method of making a reformed glass sheet comprising the steps of:

(I) providing a deformation apparatus including a central portion extending along a linear mold axis between opposed first and second ends of the central portion, the deformation apparatus further provided with a first edge mold movably coupled to the first end of the central portion and configured to be moved along the linear mold axis in a first direction toward the central portion of the deformation apparatus and a second edge mold movably coupled to the second end of the central portion and configured to be moved along the linear mold axis in a second direction toward the central portion of the deformation apparatus, wherein the second direction is opposite the first direction;

(II) providing an initial glass sheet with a central portion and opposed edge portions;

(III) positioning the initial glass sheet relative to the deformation apparatus such that the central portion of the initial glass sheet engages the central portion of the deformation apparatus and the opposed edge portions of the initial glass sheet each extend over a corresponding one of the first edge mold and the second edge mold;

(IV) heating the initial glass sheet; then (V) bending each of the opposed edge portions of the initial glass sheet to follow a corresponding contour of the first and second edge molds, wherein, after the step of bending, the reformed glass sheet is provided with opposed edge portions that are each bent away from a common side of a central portion of the reformed glass sheet; and then (VI) cooling the reformed glass sheet, wherein a greater shrinkage of the reformed glass sheet relative to a shrinkage of the deformation apparatus is accommodated by a linear translational movement along the linear mold axis of: (1) the first edge mold in the first direction and/or (2) the second edge mold in the second direction.

According to a tenth aspect, there is provided the method of aspect 9, wherein, during step (IV), the opposed edge portions of the initial glass sheet are heated to a higher temperature than the central portion of the initial glass sheet.

According to an eleventh aspect, there is provided the method of aspect 9 or aspect 10, wherein, during step (V), the opposed edge portions of the initial glass sheet are bent such that each edge portion of the reformed glass sheet has a corresponding bend joined with the central portion of the reformed glass sheet with each corresponding bend including a radius of curvature from between about 2 mm to about 50 mm.

According to a twelfth aspect, there is provided the method of any one of aspects 9-11, wherein, during step (VI), the linear translational movement does not include: (1) a rotational movement of the first edge mold relative to the central portion of the deformation apparatus, or (2) a rotational movement of the second edge mold relative to the central portion of the deformation apparatus.

According to a thirteenth aspect, there is provided a deformation apparatus for reforming a glass sheet comprising:

a central portion extending along a linear mold axis between opposed first and second ends of the central portion;

a first edge mold movably coupled to the first end of the central portion and configured to be linearly translated along the linear mold axis in a first direction toward the central portion; and a second edge mold movably coupled to the second end of the central portion and configured to be linearly translated along the linear mold axis in a second direction opposite the first direction and toward the central portion.

According to a fourteenth aspect, there is provided the deformation apparatus of aspect 13, wherein each of the edge molds are movably coupled to the central portion by a corresponding telescoping joint.

According to a fifteenth aspect, there is provided the deformation apparatus of aspect 13 or aspect 14, wherein each of the edge molds are removably coupled to the central portion.

According to a sixteenth aspect, there is provided the deformation apparatus of any one of aspects 13-15, wherein the central portion comprises a first material, and the first and second edge molds comprise a second material that is different than the first material.

According to a seventeenth aspect, there is provided the deformation apparatus of aspect 16, wherein the first material comprises stainless steel.

According to an eighteenth aspect, there is provided the deformation apparatus of aspect 16 or aspect 17, wherein the second material comprises a material selected from the group consisting of: graphite; aluminum silicate; and boron nitride.

According to a nineteenth aspect, there is provided the deformation apparatus of any one of aspects 13-18, wherein a first gap is defined between a mold surface of the central portion and a mold surface of the first edge mold, and a second gap is defined between the mold surface of the central portion and a mold surface of the second edge mold.

According to a twentieth aspect, there is provided the deformation apparatus of aspect 19, wherein the first gap and the second gap each include a gap width within a range from between about 0.2 mm to about 2 mm.

BRIEF DESCRIPTION OF THE DRAWINGS

The above and other features, aspects and advantages of the present invention are better understood when the following detailed description of the invention is read with reference to the accompanying drawings, in which:

FIG. 4 is a cross-sectional view of the deformation apparatus similar to FIG. 2, demonstrating the steps of positioning an initial glass sheet and heating the initial glass sheet;

FIG. 5 is a cross-sectional view of the deformation apparatus similar to FIG. 4, demonstrating the step of bending opposed edge portions of the initial glass sheet to follow corresponding contours of first and second edge molds;

DETAILED DESCRIPTION

Figure 1:
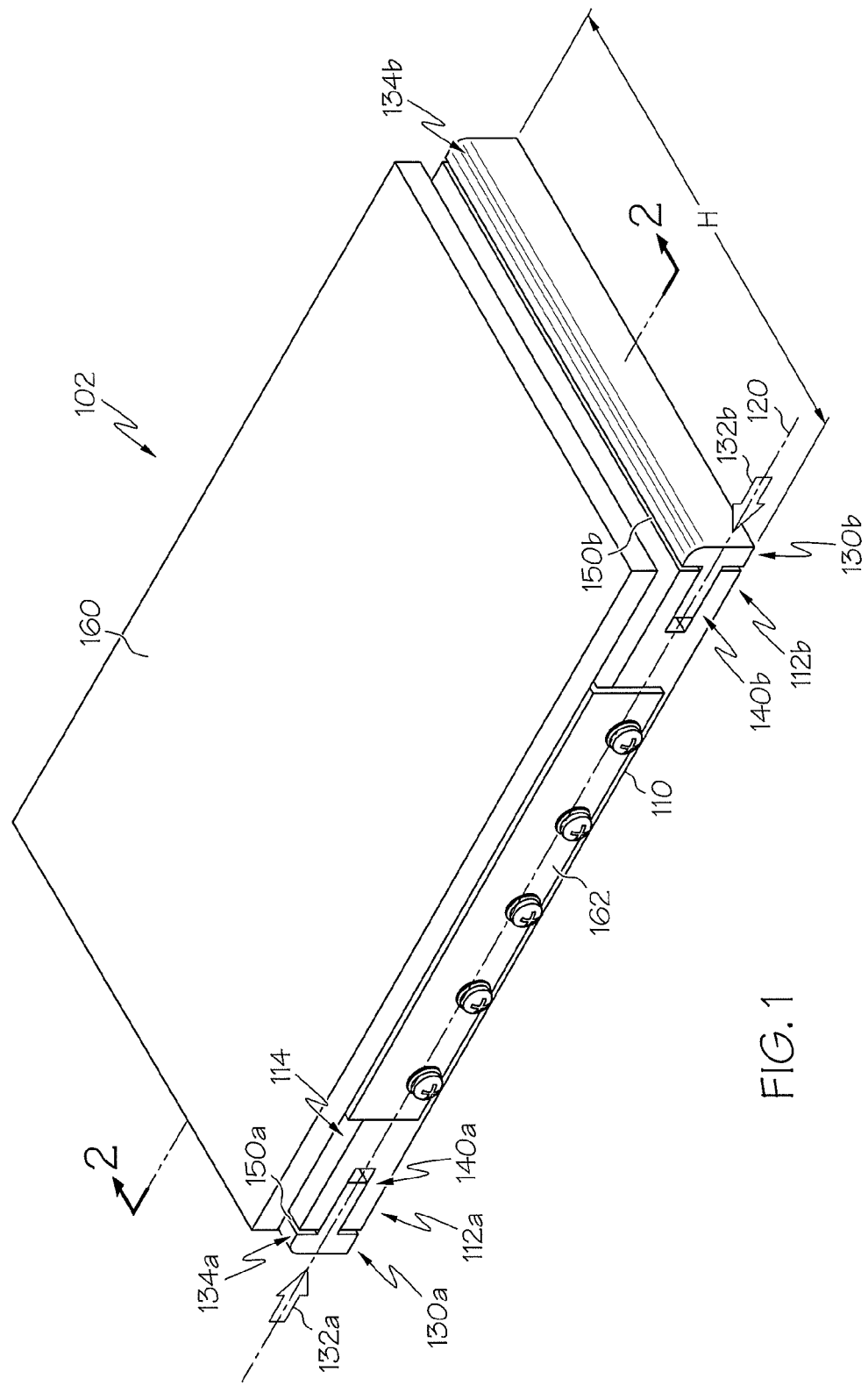
FIG. 1 is a perspective view of an example deformation apparatus.

The present invention will now be described more fully hereinafter with reference to the accompanying drawings in which example embodiments of the claimed invention are shown. Whenever possible, the same reference numerals are used throughout the drawings to refer to the same or like parts. However, the claimed invention may be embodied in many different forms and should not be construed as limited to the embodiments set forth herein. These example embodiments are provided so that this disclosure will be both thorough and complete, and will fully convey the scope of the claimed invention to those skilled in the art.

FIG. 1 illustrates an example deformation apparatus 102 for reforming an initial glass sheet previously produced by a wide range of techniques. For example, the initial glass sheet may be separated from a glass ribbon produced by way of a down-drawn, up-draw, float, fusion, press rolling, or slot draw, glass forming process or other techniques. The deformation apparatus 102 includes a central portion 110 extending along a linear mold axis 120 between opposed first and second ends 112a, 112b of the central portion 110. As shown, the central portion 110 includes a mold surface 114 that may be flat to form a substantially flat planar support surface. In further examples, the mold surface may be curved or otherwise shaped to cooperate with a central portion of the initial glass sheet.

Figure 2:
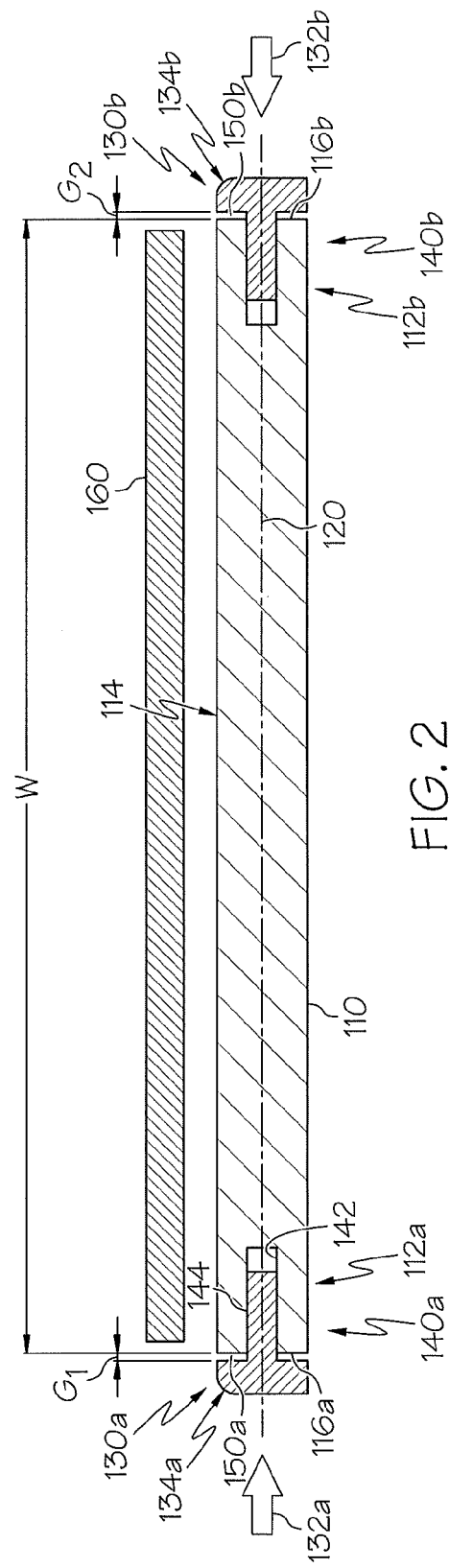
FIG. 2 is a cross sectional view of the deformation apparatus along line 2-2 of FIG. 1.

As shown in FIG. 2, the mold surface 114 of the central portion 110 can include a width "W" extending between corresponding outer edges 116a, 116b along the linear mold axis 120. The width "W" can be selected to be approximately equal to or slightly less than the width of an inner side 196 of a central portion 192 of a reformed glass sheet as shown in FIG. 5. As shown in FIG. 1, the mold surface 114 of the central portion 110 can include a height "H" that is greater than or equal to the height of the central portion of the reformed glass sheet.

As further shown in FIGS. 1 and 2, the deformation apparatus 102 further includes a first edge mold 130a that can be movably coupled to the first end 112a of the central portion 110 and configured to be linearly translated along the linear mold axis 120 in a first direction 132a toward the central portion 110. The deformation apparatus 102 also includes a second edge mold 130b coupled to the second end 112b of the central portion 110. In one example, the second edge mold 130b may be nonmovably coupled to the central portion 110. For instance, the second edge mold 130b may be mechanically fastened to or integral with the second end 112b of the central portion 110. Alternatively, as shown, the second edge mold 130b is also movably coupled to the second end 112b of the central portion 110 and configured to be linearly translated along the linear mold axis 120 in a second direction 132b opposite the first direction 132a and toward the central portion 110. Allowing both edge molds to move can allow cooling of the heated glass sheet with little or no relative movement between the central portion of the glass sheet and the central portion 110 of the deformation apparatus 102.

Movable coupling of one or both of the edge molds 130a, 130b can be achieved in a wide variety of ways. In one example, each of the edge molds 130a, 130b is movably coupled to the central portion 110 by a corresponding telescoping joint 140a, 140b although other joint configurations may be used in further examples. If provided, various telescoping joints may be provided in accordance with the disclosure. For instance, as shown in FIG. 2, each telescoping joint can include a groove 142 defined in each outer end of the first and second end portions 112a, 112b of the central portion 110. Each telescoping joint can also comprise a tongue 144 defined by each of the edge molds 130a, 130b configured to be received by the groove 142 of the corresponding first and second end portions 112a, 112b. The telescoping joint can facilitate limited linear reciprocation between each edge mold and the corresponding end portion of the central portion. Although not shown, it will be appreciated that other telescoping joint arrangements may be used in further examples. For instance, the edge molds may be provided with the groove and the central portion may be provided with a tongue. Still further the tongues and grooves may be designed to only allow a certain type of edge mold to be used with a selected end portion of the central portion. As such, user error may be avoided if only a certain edge portion is desired to be used with one end portion of the central portion.

Figure 3:
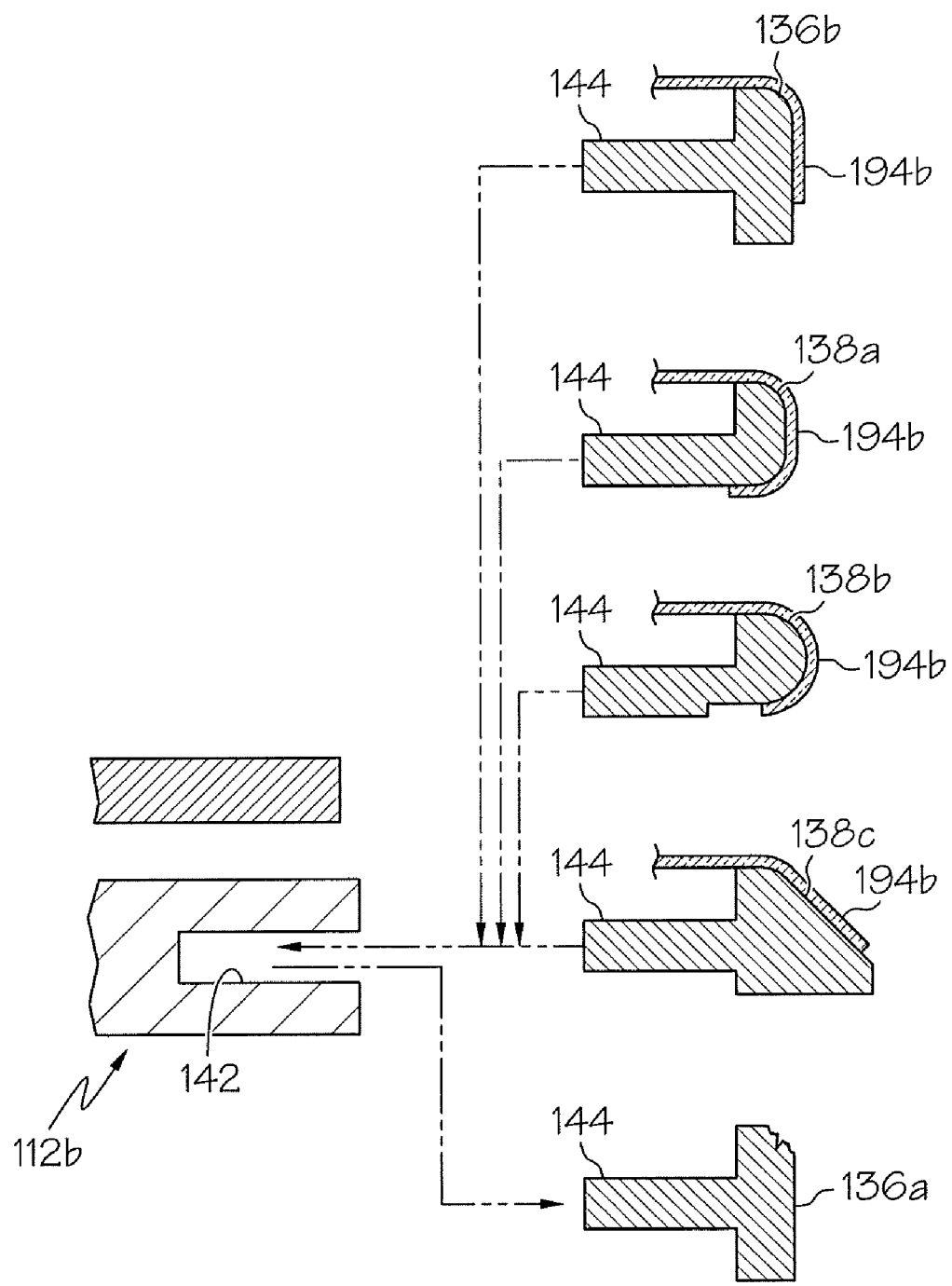
FIG. 3 is a view of an example deformation apparatus with optionally removable edge molds.

Examples may include edge molds that permit limited reciprocation without permitting the edge molds from being removed from the central portion. Alternatively, as shown in FIG. 3, in further examples, one or both of the edge molds 130a, 130b can be designed to be removably coupled to the central portion 110. For example, the telescoping joint 140a, 140b can allow for the tongue to be completely removed from the groove. As such, as shown in FIG. 3, a removable configuration may allow a damaged edge mold 136a to be removed and replaced by a substantially identical new edge mold 136b. In further examples, one edge mold may be switched with another edge mold configuration to allow selective molding of the edges to the desired shape. Example shapes are indicated by edge molds 138a, 138b, 138c with the understanding that other edge mold configurations may be used in further examples depending on the desired edge profile shape. Although the second end portion 112b is illustrated in FIG. 3, a similar construction may also be provided for the first end portion 112a. As such, the edge molds corresponding to each end portion 112a, 112b may be easily and quickly removed and replaced with new edge molds with identical or different configurations. Allowing removal of the edge molds can also facilitate replacement of a damaged edge mold or modification of the molding characteristics without having to replace the central portion.

As shown in FIGS. 1 and 2, the deformation apparatus 102 can be configured to provide a first gap 150a between the mold surface 114 of the central portion 110 and a mold surface 134a of the first edge mold 130a. Likewise, if the second edge mold 130b is movably coupled to the central portion 110, a second gap 150b can likewise be defined between the mold surface 114 of the central portion 110 and a mold surface 134b of the second edge mold 130b. Various gap sizes may be provided depending on the application. The gap sizes can be designed to be large enough to accommodate shrinkage of the reformed glass sheet relative to a shrinkage of the deformation apparatus during cooling as described more fully below. The gap size can also be designed to be small enough to avoid sagging of glass between the central portion of the reformed glass sheet and the opposed edge portions of the reformed glass sheet. Furthermore, if provided the first and second gaps 150a, 150b can be the same or different sizes depending on the application. As shown in FIG. 2, in one example, the first gap 150a and the second gap 150b each include a respective gap width $G_1$, $G_2$ within a range from between about 0.2 mm to about 2 mm although other gap sizes may be provided in further examples. Although not shown, a mechanism may be designed to help urge maintenance of a desired gap width while allowing the edge molds to move during the cooling process described more fully below. Still further, after the cooling process, further examples may optionally allow a further decrease in the gap width to facilitate release the cooled reformed glass sheet from the deformation apparatus 102.

In further examples, the deformation apparatus 102 may further include a heat shield 160. As shown in FIGS. 1 and 2, the heat shield 160, if provided, may be spaced from the mold surface 114 of the central portion 110. One or more brackets 162 maybe used to attach the heat shield 160 at the desired spaced position relative to the mold surface 114. In further examples, the heat shield 160 may be suspended relative to the mold surface without being attached to the central portion. The optional heat shield 160 can be configured to shield a substantial area of the central portion 110 from a heat source 170a, 170b without shielding a substantial portion of the first edge mold 130a and second edge mold 130b from the heat source 170a, 170b. See, for example, FIG. 4.

The heat shield 160, central portion 110 and edge molds 130a, 130b may comprise the same material or different materials depending on the application. In one example, the heat shield can comprise a refractory material or other insulating material. In still further examples, the central portion 110 comprises a first material, and the first and second edge molds 130a, 130b comprise a second material that is different than the first material. For example, the first material can be selected to sustain a temperature corresponding to a viscosity of the glass of about $6 \times 10^9$ P. Example first materials can comprise stainless steel, graphite, clay, silica or other materials. For instance, the first material can comprise stainless steel that is a relatively inexpensive material capable of supporting a central portion of the initial glass sheet without the need to resist high temperature environments since the central portion is shielded from significant heat exposure by way of the heat shield 160. Furthermore, the second material can comprise a material that can resist high temperature environments without transfer of contaminants (e.g., by oxidation) of material from the edge molds during the heating and molding procedures. For example, the second material may comprise a material selected from the group consisting of: graphite; aluminum silicate; and boron nitride. These materials may be more expensive than the material used to form the central portion of the deformation apparatus. Moreover, the edge molds may wear out faster than the central portion. As such, providing edge molds that are removable may allow inexpensive replacement of the edge molds without having to also replace the central portion. Moreover, the overall cost of the deformation apparatus 102 may be reduced since the central portion may be fabricated from a relatively inexpensive material compared to the material used to fabricate the edge molds. If removable, the edge molds may be provided with a restriction mechanism, for example a stop, to prevent inadvertent removal of the edge mold with respect to the central portion at an undesirable time.

Still further, the viscosity of the glass supported by the central portion 110 is high enough to allow use of most materials (e.g., stainless steel) without observing sticking between the glass and the central portion 110. On the other hand, appropriate selection of other materials (e.g., graphite) may be used for the edge molds to avoid sticking between the glass and the edge molds that might otherwise occur with glass having a low viscosity.

Methods of making a reformed glass sheet 190 will now be described. The method may begin by providing the deformation apparatus 102 including the central portion 110 extending along the linear mold axis 120 between opposed first and second ends 112a, 112b of the central portion 110. The deformation apparatus 102 is further provided with a first edge mold 130a movably coupled to the first end 112a of the central portion 110 and a second edge mold 130b that may optionally be movably coupled to the second end 112b of the central portion 110. As shown in FIG. 3, the method may include the step of replacing at least one of the edge molds with a replacement edge mold. For instance, the damaged edge mold 136a may be removed and replaced with a new edge mold 136b. Alternatively, edge molds may be replaced with various alternative edge molds (e.g., 136b, 138a, 138b, 138c) having a preselected configuration depending on the desired shape of the formed edge for the reformed glass sheet.

Turning to FIG. 4, a cross-sectional view of the deformation apparatus 102 is illustrated with an initial glass sheet 180. The initial glass sheet may be formed with various techniques. For example, the initial glass sheet 180 may be formed by flowing molten glass into an isopipe wherein a glass ribbon is formed by a fusion down-draw process. The glass ribbon may then be subsequently divided to provide the initial glass sheet 180. However, as noted above, any suitable glass-sheet forming process may be used to provide glass sheets for use with the deformation apparatus 102. As shown in FIG. 4, the initial glass sheet 180 includes a central portion 182 and opposed edge portions 184a, 184b. The method includes the step of positioning the initial glass sheet 180 relative to the deformation apparatus 102 such that the central portion 182 of the initial glass sheet 180 engages the central portion 110 of the deformation apparatus 102 and the opposed edge portions 184a, 184b of the initial glass sheet 180 each extend over a corresponding one of the first edge mold 130a and the second edge mold 130b. In one example, the central portion 110 of the deformation apparatus can include a mold surface 114 that is substantially flat. In such examples, the method can further include the step of positioning the central portion 182 of the initial glass sheet 180 flat against a flat mold support surface 114 of the central portion 110 of the deformation apparatus 102. As shown, the flat support surface 114 can be designed to be substantially parallel to the linear mold axis 120.

As further shown in FIG. 4, at least the opposed edge portions 184a, 184b of the initial glass sheet 180 are heated to facilitate bending of the edge portions 184a, 184b relative to the central portion 182 of the initial glass sheet 180. Heating can be conducted with a wide range of techniques. For example, the deformation apparatus 102 may be positioned within a heating chamber to allow heating of the initial glass sheet. In further examples, one or more heaters may be positioned to facilitate heat transfer (e.g., by radiation or convection) to the initial glass sheet. As shown, one technique may involve heating the opposed edge portions 184a, 184b to a higher temperature than the central portion 182 of the initial glass sheet 180. As shown, a pair of heat sources 170a, 170b may be provided to heat the opposed edge portions 184a, 184b although a single or more than two heat sources may be provided in further examples.

In another example, the central portion 182 of the initial glass sheet 180 may be shielded such that the opposed edge portions 184a, 184b of the initial glass sheet 180 are heated to a higher temperature than the central portion 182 of the initial glass sheet 180.

Heating only the edge portions 184a, 184b can permit the central portion 110 of the deformation apparatus 102 to be fabricated from a relatively inexpensive material that may not have desired performance characteristics under high temperature conditions. As such, only the edge molds 130a, 130b need to be fabricated from the relatively expensive or high performance materials having the desired characteristics under high temperature conditions. Furthermore, shielding the central portion 182 of the initial glass sheet can help retain a high level of flatness in this area while allowing only the outermost edge portions of the initial glass sheet to be exposed to heat that may otherwise affect the flatness of the central portion 182 if left unshielded. As such, deformation of the edge portions 184a, 184b may be achieved while preventing deformation or optical quality defects in the central portion 182 of the initial glass sheet 180.

FIG. 5 demonstrates the step of bending each of the opposed edge portions 184a, 184b of the initial glass sheet 180 to follow a corresponding contour of the first and second edge molds 130a, 130b. Bending can be carried out in various ways. For example, as shown on the left side of FIG. 5, an edge portion 194a of the reformed glass sheet 190 may be formed by heating the edge portion 184a of the initial glass sheet until gravity urges the edge portion 184*a* to drop down under its own weight to conform to the shape of the mold surface 134*a* of the corresponding edge mold 130*a*.

Alternatively, as shown on the right side of FIG. 5, a conforming member 200 may be provided that moves in a direction 204 to compress a mold surface 202 against an outer surface of the edge portion 194*b* such that the edge portion 194*b* conforms to the shape of the mold surface 134*b* of the edge mold 130*b*. As shown in FIG. 5, after the step of bending, the reformed glass sheet 190 is provided with opposed edge portions 194*a*, 194*b* that are each bent away from a common inner side 196 of a central portion 192 of the reformed glass sheet 190.

Figure 6:
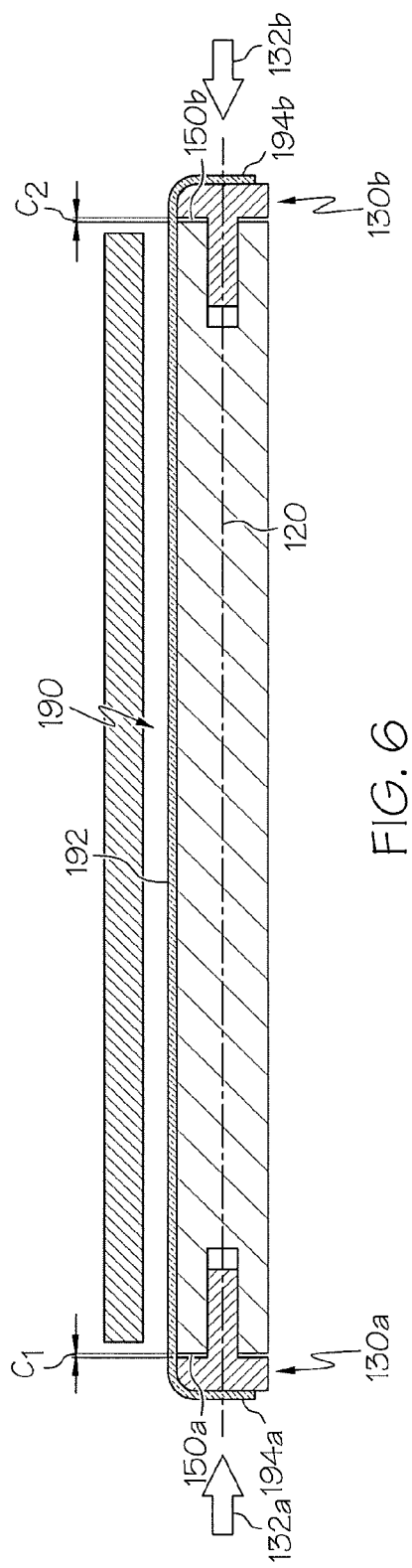
FIG. 6 is a cross-sectional view of the deformation apparatus similar to FIG. 5, demonstrating the step of cooling the reformed glass sheet, wherein a greater shrinkage of the reformed glass sheet relative to a shrinkage of the deformation apparatus is accommodated by movement of the edge molds relative to the central portion of the deformation apparatus.

As shown in FIG. 6, the reformed glass sheet 190 can then be cooled. As the glass sheet 190 cools, it may tend to shrink relative to the deformation apparatus 102. The deformation apparatus 102 can be designed to accommodate shrinking of the reformed glass sheet 190 to avoid cracking, debonding, or other damage to the glass sheet. For example, the deformation apparatus 102 can allow relative shrinking of the reformed glass sheet 190 without forcing the edge portions 194*a*, 194*b* away from one another that can otherwise cause high stress and fracture of the reformed glass sheet 190 with a relatively small draft angle a (e.g., less than around 135°). As such, with reference to FIGS. 1 and 3, the deformation apparatus 102 can accommodate edge molds 130*a*, 130*b* having a draft angle of about 90° or edge molds 138*a*, 138*b* with curled edge portions with a draft angle a of less than 135°. Furthermore, the deformation apparatus 102 can also allow relative shrinking of the reformed glass sheet 190 to avoid premature lifting or "debonding" of the reformed glass sheet with a relatively large draft angle a (e.g., greater than or equal to about 135°). For example, with reference to the edge mold 138*c* in FIG. 3, even with a relatively large draft angle a, the deformation apparatus 102 can avoid stress fractures that may otherwise result from premature lifting of the edge portions 194*a*, 194*b* relative to the central portion 192.

However, with the illustrated deformation apparatus 102, as the reformed glass sheet 190 is cooled, a greater shrinkage of the reformed glass sheet 190 relative to a shrinkage of the deformation apparatus 102 may be accommodated by a movement of at least the first edge mold 130*a* in the first direction 132*a* toward the central portion 110 of the deformation apparatus 102. As describe above, in addition or alternatively, the second edge mold 130*b* can be movably coupled to the second end 112*b* of the central portion 110. In such examples, the greater shrinkage of the reformed glass sheet 190 relative to the shrinkage of the deformation apparatus 102 can be further accommodated by a movement of the second edge mold 130*b* in the second direction 132*b* toward the central portion 110 of the deformation apparatus 102, wherein the second direction 132*b* is opposite the first direction 132*a*.

As further shown in FIG. 6, further examples can include a linear translational movement of the first edge mold 130*a* along the linear mold axis 120 in the first direction 132*a*. Similarly, the movement of the second edge mold 130*b* can include a linear translational movement along the linear mold axis 120 in the second direction 132*b*. As shown, the movement reduces size of the overall gap width between the edge molds 130*a*, 130*b* and the central portion 110 of the deformation apparatus 102. Indeed, as shown in FIG. 2, the first gap 150*a* has an initial gap width "$G_1$" and the second gap 150*b* has an initial gap width "$G_2$". After cooling, as shown in FIG. 6, the first gap 150*a* has a cooled gap width "$C_1$" and the second gap 150*b* has a cooled gap width "$C_2$". As such, the overall initial gap width "$G_1+G_2$" is greater than the overall cooled gap width "$C_1+C_2$". The difference between the overall initial gap width and the overall cooled gap width can substantially represent the overall shrinkage of the reformed glass sheet along the linear mold axis 120 as the reformed glass sheet cools. Further, if the first edge portion 194*a* and/or the second edge portion 194*b* are hooked around the first and second edge molds with the design, for example, illustrated by edge mold 138*a* or edge mold 138*b*, the cooled gap widths "$C_1$" and "$C_2$" may be chosen to be large enough to allow further movement of the first and second edge molds in the respective directions 132*a*, 132*b* so to facilitate removal of the reformed glass sheet 190 in a direction perpendicular to the mold axis 120. That is, it is possible to use the gaps $G_1$ and $G_2$ in order to have a retraction of the whole mold higher than the one of the glass even when the mold material has a lower CTE than the glass.

In further examples, the deformation apparatus 102 may be optionally designed such that the movement of the first edge mold 130*a* does not include a rotational movement of the first edge mold 130*a* relative to the central portion 110. Likewise, if movable, the deformation apparatus 102 may also be optionally designed such that the movement of the second edge mold 130*b* does not include a rotational movement of the second edge mold 130*b* relative to the central portion 110 of the deformation apparatus 102. Preventing rotational movement may be desirable to avoid premature decoupling of the reformed glass sheet 190 from the mold during the step of cooling. Preventing rotational movement may also be desired to reduce stress that may otherwise be generated by bending the edge portions 194*a*, 194*b* relative to the central portion 192 of the reformed glass sheet 190.

Figure 7:
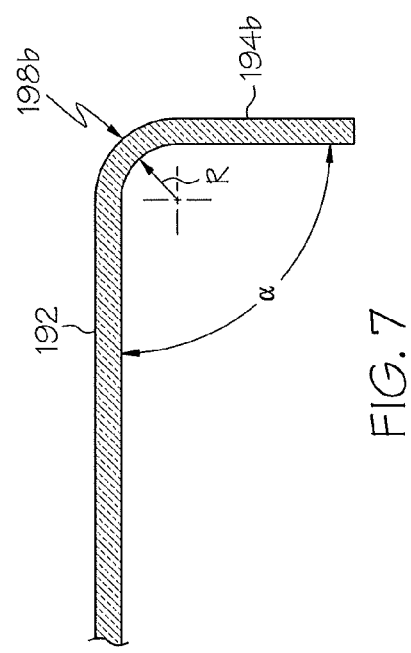
FIG. 7 is an enlarged view of an edge portion of the reformed glass sheet shown in FIG. 6.

The above deformation apparatus and methods of making the reformed glass sheet can also provide bends at the edge portions that are relatively small. Such a small bend radius may be achieved without cracking or other damage to the reformed glass sheet. For instance, as shown in FIGS. 5 and 7, the opposed edge portions 184*a*, 184*b* of the initial glass sheet 180 may be bent such that each edge portion 184*a*, 184*b* of the reformed glass sheet 190 has a corresponding bend 198*a*, 198*b* joined with the central portion 110 of the reformed glass sheet 190. As schematically shown in FIG. 7, each corresponding bend can include a radius of curvature "R" from between about 2 mm to about 50 mm. In further examples, the radius of curvature "R" is from between about 2 mm to about 15 mm.

Figure 8:
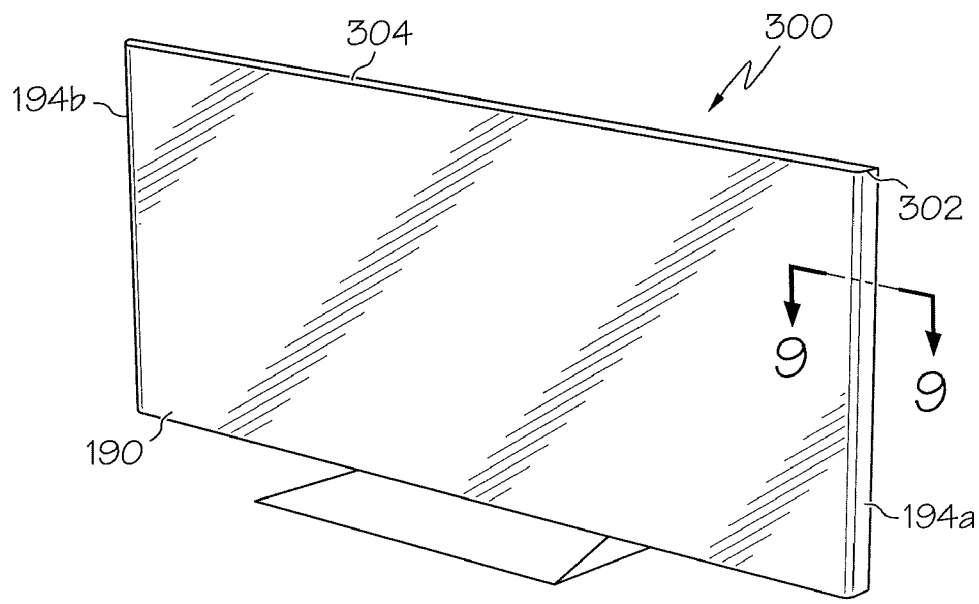
FIG. 8 is a perspective view of a display incorporating the reformed glass sheet shown in FIG. 6.
Figure 9:
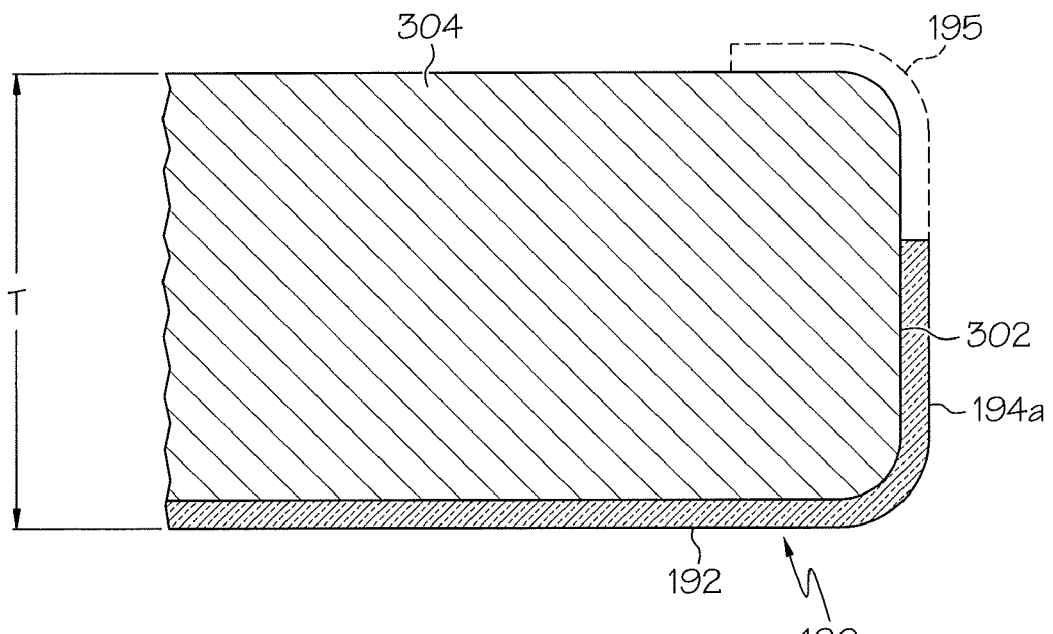
FIG. 9 is a partial sectional view of the display apparatus along line 9-9 of FIG. 8.

Various devices may incorporate the reformed glass sheet 190 including characteristics described above. In just one example, the reformed glass sheet may be incorporated in a display application. For instance, FIG. 8 illustrates the reformed glass sheet being incorporated as part of a display 300 although the reformed glass sheet may be incorporated in other devices in further examples. Example displays incorporating the reformed glass sheet 190 can comprise a television or a monitor, which may be an LCD, an OLED, EPD, or PDP, although other displays may be used in further examples. The edge portions (e.g., see 194*a* in FIG. 9) can be designed to bend around the outer edge 302 of other device components (e.g., display components 304). In one example, the edge portions can bend around a substantial portion or the entire thickness "T" of the other device components (e.g., display components 304). As shown in broken lines in FIG. 9, a portion 195 of the edge portion can even extend behind portions of the device components. As such, a monolithic construction may be achieved to increase a face area of the device, protect the outer edges of the device and/or provide the device with a desirable overall monolithic appearance. For example, in applications where the device comprises a display 300, the monolithic construction can increase the viewing area of the display, provide protection to the outer edges of the display and also provide the display with an overall monolithic appearance. Moreover, deformation apparatus 102 and methods of the disclosure may be used to process relatively large initial glass sheets 180. For example, the initial glass sheet 180 may have a width of about 2 meters and a height of about 1 meter although other initial glass sheet sizes may be processed in accordance with aspects of the disclosure.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method of making a reformed glass sheet comprising the steps of:
   (I) providing a deformation apparatus including a central portion extending along a linear mold axis between opposed first and second ends of the central portion, the deformation apparatus further provided with a first edge mold movably coupled to the first end of the central portion and a second edge mold coupled to the second end of the central portion;
   (II) providing an initial glass sheet with a central portion and opposed edge portions;
   (III) positioning the initial glass sheet relative to the deformation apparatus such that the central portion of the initial glass sheet engages the central portion of the deformation apparatus and at least one of the opposed edge portions of the initial glass sheet extends over a corresponding one of the first edge mold and the second edge mold;
   (IV) heating the initial glass sheet; then
   (V) bending at least one of the extending edge portions of the initial glass sheet to follow a contour of a corresponding one of the first and second edge molds, wherein, after the step of bending, the reformed glass sheet is provided with opposed edge portions with at least one of the edge portions bent away from a side of a central portion of the reformed glass sheet; and then
   (VI) cooling the reformed glass sheet, wherein a greater shrinkage of the reformed glass sheet relative to a shrinkage of the deformation apparatus is accommodated by a movement of at least the first edge mold in a first direction toward
   the central portion of the deformation apparatus, wherein the movement of the first edge mold does not include a rotational movement of the first edge mold relative to the central portion of the deformation apparatus.

2. The method of claim 1, wherein, during step (VI), the movement of the first edge mold includes a linear translational movement along the linear mold axis in the first direction.

3. The method of claim 1, wherein the second edge mold is movably coupled to the second end of the central portion, and during step (VI), the greater shrinkage of the reformed glass sheet relative to the shrinkage of the deformation apparatus is further accommodated by a movement of the second edge mold in a second direction toward the central portion of the deformation apparatus, wherein the second direction is opposite the first direction.

4. The method of claim 1, wherein, during step (IV), at least one of the opposed edge portions of the initial glass sheet is heated to a higher temperature than the central portion of the initial glass sheet.

5. The method of claim 1, wherein during step (IV), the central portion of the initial glass sheet is shielded such that at least one of the extending edge portions is heated to a higher temperature than the central portion of the initial glass sheet.

6. The method of claim 1, wherein, during step (V), the at least one of the extending edge portions is bent such that the bent edge portion is joined with the central portion of the reformed glass sheet with the bend including a radius of curvature from between about 2 mm to about 50 mm.

7. The method of claim 1, wherein, step (III) includes positioning the initial glass sheet relative to the deformation apparatus such that both of the opposed edge portions of the initial glass sheet extend over a corresponding one of the first edge mold and the second edge mold, and step (V) includes bending both of the edge portions of the initial glass sheet to follow a corresponding contour of the first and second edge molds, wherein, after the step of bending, the reformed glass sheet is provided with opposed edge portions that are each bent away from the side of the central portion of the reformed glass sheet.

8. A method of making a reformed glass sheet comprising the steps of:
   (I) providing a deformation apparatus including a central portion extending along a linear mold axis between opposed first and second ends of the central portion, the deformation apparatus further provided with a first edge mold movably coupled to the first end of the central portion and configured to be moved along the linear mold axis in a first direction toward the central portion of the deformation apparatus and a second edge mold movably coupled to the second end of the central portion and configured to be moved along the linear mold axis in a second direction toward the central portion of the deformation apparatus, wherein the second direction is opposite the first direction;
   (II) providing an initial glass sheet with a central portion and opposed edge portions;
   (III) positioning the initial glass sheet relative to the deformation apparatus such that the central portion of the initial glass sheet engages the central portion of the deformation apparatus and the opposed edge portions of the initial glass sheet each extend over a corresponding one of the first edge mold and the second edge mold;
   (IV) heating the initial glass sheet; then
   (V) bending each of the opposed edge portions of the initial glass sheet to follow a corresponding contour of the first and second edge molds, wherein, after the step of bending, the reformed glass sheet is provided with opposed edge portions that are each bent away from a common side of a central portion of the reformed glass sheet; and then
   (VI) cooling the reformed glass sheet, wherein a greater shrinkage of the reformed glass sheet relative to a shrinkage of the deformation apparatus is accommodated by a linear translational movement along the linear mold axis of: (1) the first edge mold in the first direction and/or (2) the second edge mold in the second
   direction, wherein, the linear translational movement does not include: (1) a rotational movement of the first edge mold relative to the central portion of the deformation apparatus, or (2) a rotational movement of the second edge mold relative to the central portion of the deformation apparatus.

9. The method of claim 8, wherein, during step (IV), the opposed edge portions of the initial glass sheet are heated to a higher temperature than the central portion of the initial glass sheet.

10. The method of claim 8, wherein, during step (V), the opposed edge portions of the initial glass sheet are bent such that each edge portion of the reformed glass sheet has a corresponding bend joined with the central portion of the reformed glass sheet with each corresponding bend including a radius of curvature from between about 2 mm to about 50 mm.

* * * * *